No. 620,896. Patented Mar. 14, 1899.
S. D. EDGAR.
FISH HOOK.
(Application filed Sept. 14, 1898.)
(No Model.)

Witnesses
J. Frank Culverwell,
D. P. Wachsmuth.

Silas D. Edgar, Inventor.
By his Attorneys,
C. A. Snow & Co.

THE NORRIS PETERS CO., PHOTO-LITHO., WASHINGTON, D. C.

UNITED STATES PATENT OFFICE.

SILAS D. EDGAR, OF BLOOMSBURG, PENNSYLVANIA, ASSIGNOR OF THREE-FOURTHS TO PAUL E. WIRT, OF SAME PLACE.

FISH-HOOK.

SPECIFICATION forming part of Letters Patent No. 620,896, dated March 14, 1899.

Application filed September 14, 1898. Serial No. 690,949. (No model.)

*To all whom it may concern:*

Be it known that I, SILAS D. EDGAR, a citizen of the United States, residing at Bloomsburg, in the county of Columbia and State of Pennsylvania, have invented a new and useful Fish-Hook, of which the following is a specification.

This invention relates to fish-hooks; and it has for its object to provide a novel disposition of the barb or barbs of the hook, so that the same will hook more easily and take a stronger hold on the fish than the ordinary types of fish-hooks having the barb or barbs thereof located within the area of the space between the shank and short arm of the hook and pointing in a direction toward the shank.

In the ordinary types of fish-hooks above referred to, which have the barb lying at the inner side of the short arm and projecting in a direction toward the shank of the hook, the shank, as well as the short arm of the hook, affords a "shelter" for the barb, so that the same will readily slip out of the incision in the mouth of the fish when the latter "runs up" on the hook. This frequently occurs with fish of much strength, which after the first impulse to pull away from the hook frequently run up on the same much faster than the slack line can be taken in, and thereby oftentimes release themselves from the hook. The present invention overcomes these objections to the ordinary types of fish-hook by arranging the barb or barbs in a plane outside of the space between the short arm and the shank of the hook and pointing in a direction away from the shank, so that when the hook is pushed backward in the torn or slitted incision, as when a fish runs up on the hook, the barb or barbs catch or engage at the sides or walls of the incision or slit and will not be guided out by the shank, as is the case at times in the ordinary construction referred to.

With these and other objects in view, which will readily appear as the nature of the invention is better understood, the same consists in the novel construction, combination, and arrangement of parts hereinafter more fully described, illustrated, and claimed.

Figure 1:
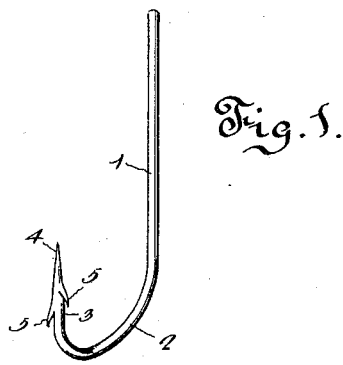
Figure 2:
Figure 3:
Figure 4:
Figure 5:
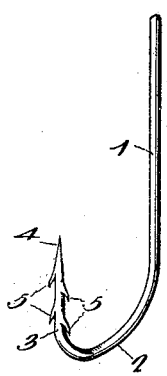

In the drawings, Figure 1 is a perspective view of a fish-hook constructed in accordance with this invention. Fig. 2 is a side view thereof. Fig. 3 is a sectional view on the line 3 3 of Fig. 2. Fig. 4 is a perspective view of a modified form of the fish-hook, showing the employment of three of the lateral or side barbs. Fig. 5 is a view, similar to Fig. 4, of another modification, showing the employment of an even number of barbs on each side of the short arm of the hook.

Referring to the accompanying drawings, the numeral 1 designates the shank of a hook, which is bent at one end to form the usual bent portion 2, having the short hook-arm 3, which is disposed in substantial parallelism to the main shank 1 of the hook. To this extent the general conformation of the hook is the same as the ordinary types of fish-hooks now on the market; but in the present invention the short arm 3 of the hook is provided with a plain tapering point 4, below the plane of which point the short arm 3 is provided with one or more lateral spear barbs or spurs 5. The barbs 5 project from the short arm of the hook at a downward inclination from the plain tapering point 4 thereof, but are projected from the short arm of the hook in a plane outside of the space between such arm and the shank of the hook and point in a direction away from the shank, so that no projections whatever are formed at the inner sides of either the shank or the short arm 3. By reason of this construction neither the shank nor the short arm of the hook afford a shelter for the barb or barbs, as the latter may be properly said to be arranged on the outside of the short arm of the hook.

The essential feature of the present invention is the disposition of the barb or barbs at the outer side of the short arm of the hook, entirely outside of the space between such arm and the shank, and while one barb might be sufficient it is preferable to employ two barbs, as illustrated in the drawings. In using two barbs on the short arm of the hook, as shown in the drawings, such barbs, while arranged on or projected from opposite sides of the short arm 3, are not diametrically opposite, but are respectively arranged one above the other or in different planes, yet both projecting in a direction preferably at right angles to a line extending across the space between the short arm and shank of the hook. By reason of arranging the two barbs respectively one above the other or in different planes the second barb or projection will pass into the incision or cut through the initial opening made by the first-entering barb or projection, thereby obviating an enlargement of the opening or incision by the second-entering barb.

In the use of the hook the barb or barbs will engage on the side or walls of the slit in such a way as to firmly hold the fish, as hereinbefore explained, and at this point it may be observed that by disposing the barb or barbs at the side of the short arm of the hook in the manner described such barb or barbs can be made quite slender and materially smaller than the barbs of ordinary fish-hooks without detracting from the efficiency of the hook, while at the same time insuring the engagement of the hook when "struck" lightly by the fish.

It has already been pointed out that one or two barbs may be employed in carrying out the present invention; but it will be obvious that since the essential feature of the invention is the disposition of the barb or barbs at the side of the short arm of the hook entirely outside of the space between such arm and the shank a greater number than two barbs may be used.

In Fig. 4 of the drawings is shown a modification of the hook in which three barbs are formed on the short arm of the hook, and in such modification of the invention one of the barbs is closely adjacent to the point of the hook, while the remaining two barbs are respectively disposed one above the other at opposite sides of the short arm of the hook, but projecting laterally therefrom in the manner already described.

The invention may be still further modified by using an even number of barbs on each side of the short arm of the hook, as illustrated in Fig. 5 of the drawings, and in this modification of the invention the same alternate arrangement of the barbs is preserved to prevent an enlargement of the opening or incision made by the first-entering barb.

It will be understood that any change in the form, proportion, and minor details of construction may be resorted to without departing from the principle or sacrificing any of the advantages of my invention.

Having thus described the invention, what is claimed as new, and desired to be secured by Letters Patent, is—

1. A fish-hook having its short arm and shank arranged in substantial parallelism, and said short arm being provided at the side with a lateral barb or barbs pointing in a direction away from and outside of the space between the short arm and the shank, substantially as set forth.

2. A fish-hook having its short arm provided with a plain tapering point, and below the plane of such point with lateral barbs projecting from the outer side thereof and pointing in a direction away from and outside of the space between the short arm and shank of the hook, said lateral barbs being respectively arranged at opposite sides of the short arm of the hook and disposed one above the other, or in different planes, substantially as set forth.

3. A fish-hook, having its short arm provided, at the side, with a lateral barb or barbs, pointing in a direction away from and outside of the space between the short arm and shank of the hook, substantially as set forth.

In testimony that I claim the foregoing as my own I have hereto affixed my signature in the presence of two witnesses.

SILAS D. EDGAR.

Witnesses:
  GEO. S. ROBBINS,
  C. C. PEACOCK.